(12) United States Patent
Hill

(10) Patent No.: US 8,396,423 B2
(45) Date of Patent: Mar. 12, 2013

(54) WIRELESS COMMUNICATIONS SYSTEM PROVIDING WIRELESS MESSAGE DATA DELIVERY THROUGH INTERMEDIARY WIRELESS COMMUNICATIONS DEVICE AND RELATED METHODS

(75) Inventor: Thomas C. Hill, Crystal Lake, IL (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/036,565

(22) Filed: Feb. 28, 2011

(65) Prior Publication Data

US 2012/0220226 A1   Aug. 30, 2012

(51) Int. Cl.
*H04B 7/00* (2006.01)

(52) U.S. Cl. ...... 455/41.2; 455/41.1; 370/338; 713/171; 705/21; 705/30; 705/44

(58) Field of Classification Search .................. 455/41.1, 455/41.2; 370/338; 713/171; 705/21, 30, 705/44
See application file for complete search history.

(56) References Cited

U.S. PATENT DOCUMENTS

| 2008/0219227 | A1* | 9/2008 | Michaelis | 370/338 |
| 2009/0144550 | A1* | 6/2009 | Arunan | 713/171 |
| 2010/0064006 | A1 | 3/2010 | Chaintreau et al. | |
| 2010/0121726 | A1* | 5/2010 | Coulter et al. | 705/21 |

FOREIGN PATENT DOCUMENTS

EP    1569386    8/2005

OTHER PUBLICATIONS

Van't Hof et al. "*Convenience takes a great step forward. But what about the footprints we leave?*" Near Field Communication http://www.cvth.nl/nfc1.pdf Oct. 14, 2008.
"*Near Field Communication in the real world Turning the NFC promise into profitable, everyday applications*" http://www.nfcforum org/resources/white_papers/Innovision_whitePaper1.pdf.
Conti et al., "From Opportunistic Networks to Opportunistic Computing", IEEE vol. 48, No. 9, Sep. 2010, pp. 126-139.
He et al., "Message Propagation in Ad-Hoc-Based Proximity Mobile Social Netowrks", IEEE, Mar. 2012, pp. 141-146.

* cited by examiner

*Primary Examiner* — April G Gonzales
(74) *Attorney, Agent, or Firm* — Allen, Dyer, Doppelt, Milbrath & Gilchrist, P.A.

(57) ABSTRACT

A wireless communications system may include a plurality of wireless communications devices (WCDs). A source WCD from among the plurality of WCDs may be configured to designate message data for at least one target WCD from among the plurality of WCDs, where the message data has a security restriction associated therewith. At least one intermediary WCD from among the plurality of WCDs may be configured to wirelessly receive the message data from the source WCD when in proximity thereto, and with restricted access to the message data based upon the security restriction. The at least one target WCD may be configured to wirelessly receive the message data from the at least one intermediary WCD when in proximity thereto and with less access restriction to the message data than the at least one intermediary WCD.

20 Claims, 8 Drawing Sheets

WIRELESS COMMUNICATIONS SYSTEM PROVIDING WIRELESS MESSAGE DATA DELIVERY THROUGH INTERMEDIARY WIRELESS COMMUNICATIONS DEVICE AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
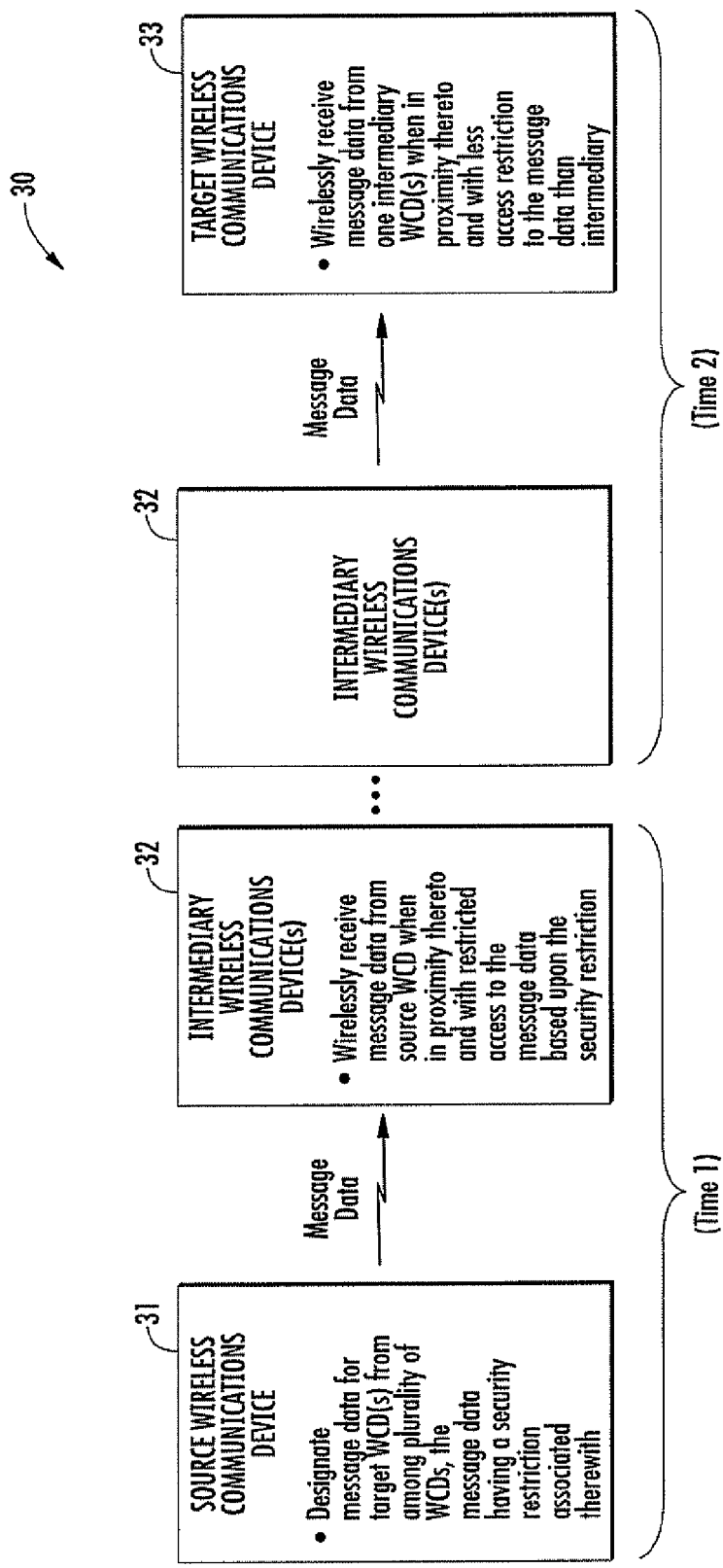
FIG. 1 is a schematic block diagram of a wireless communications system in accordance with an example embodiment.

The present description is made with reference to the accompanying drawings, in which embodiments are shown. However, many different embodiments may be used, and thus the claims should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communications system is disclosed herein which may include a plurality of wireless communications devices (WCDs). A source WCD from among the plurality of WCDs may be configured to designate message data for at least one target WCD from among the plurality of WCDs, where the message data has a security restriction associated therewith. Furthermore, at least one intermediary WCD from among the plurality of WCDs may be configured to wirelessly receive the message data from the source WCD when in proximity thereto and with restricted access to the message data based upon the security restriction. Additionally, the at least one target WCD may be configured to wirelessly receive the message data from the at least one intermediary WCD when in proximity thereto and with less access restriction to the message data than the at least one intermediary WCD. The system may therefore advantageously provide a secure approach for a wireless communications devices to "hand deliver" information.

By way of example, the plurality of WCDs may be configured to wirelessly communicate the message data via near-field communication (NFC). The source WCD may be further configured to associate a delivery time period with the message data, and the at least one intermediary WCD may be configured to prohibit delivery of the message data to the at least one target WCD outside of the delivery time period. Similarly, the source WCD may be further configured to associate a geographic delivery area with the message data, and the at least one intermediary WCD may be configured to prohibit delivery of the message data to the at least one target WCD outside of the geographic delivery area.

The at least one target WCD may be further configured to generate an acknowledgement for the source WCD upon receipt of the message data from the at least one intermediary WCD. In addition, the at least one intermediary WCD may comprise a plurality of intermediary WCDs, and the source WCD may be configured to distribute different portions of the message data among the plurality of intermediary WCDs for delivery to the at least one target WCD. Additionally, the at least one intermediary WCD may be configured to generate at least one reminder to deliver the message data to the at least one target WCD.

The at least one target WCD may comprise a plurality of target WCDs, and the source WCD may be configured to generate respective message data for each of the target WCDs. As such, the at least one intermediary WCD may also be configured to deliver respective message data to each of the target WCDs. Further, the at least one intermediary WCD may be configured to notify the source WCD if the message data is not delivered to the at least one target WCD within a time period, and the source WCD may be configured to generate a reminder for the at least one intermediary WCD based upon the notification.

By way of example, the at least one intermediary WCD may comprise a mobile WCD. Also, the restricted access may comprise read-only access. The security restriction may comprise data encryption, for example, and the at least one target WCD may be configured to decrypt the message data received from the at least one intermediary WCD. Also by way of example, the message data may comprise at least one of text data, audio data, image data, or video data.

A related wireless communications device may include at least one wireless transceiver, and a controller cooperating with the at least one wireless transceiver. The controller may be configured to operate in one of a plurality of modes comprising a source mode, an intermediary mode, and a target mode. The source mode may be for designating message data for at least one target WCD from among a plurality of WCDs, where the message data has a security restriction associated therewith. The intermediary mode may be for wirelessly receiving message data from a source WCD operating in the source mode when in proximity therewith and with restricted access to the message data based upon a security restriction associated therewith. The target mode may be for wirelessly receiving the message data from at least one intermediary WCD operating in the intermediary mode when in proximity therewith and with less access restriction to the message data than the at least one intermediary WCD.

A related wireless communications method may be for a plurality of WCDs and may include designating message data at a source WCD for at least one target WCD, where the message data may have a security restriction associated therewith. The method may further include wirelessly receiving the message data from the source WCD at at least one intermediary WCD when in proximity to the source WCD and with restricted access to the message data based upon the security restriction, and wirelessly receiving the message data at at least one target WCD from the at least one intermediary WCD when in proximity thereto and with less access restriction for the target WCD to the message data than the at least one intermediary WCD.

A related non-transitory computer-readable medium is also provided which may have computer-executable instructions for causing a WCD to perform steps including designating message data for at least one target WCD from among a plurality of WCDs in a source mode, where the message data may have a security restriction associated therewith. The steps may further include wirelessly receiving message data from a source WCD operating in the source mode when in proximity therewith and with restricted access to the message data based upon a security restriction associated therewith in an intermediary mode, and wirelessly receiving the message data from at least one intermediary WCD operating in the intermediary mode when in proximity therewith and with less access restriction to the message data in a target mode than the intermediary WCD.

Figure 6:
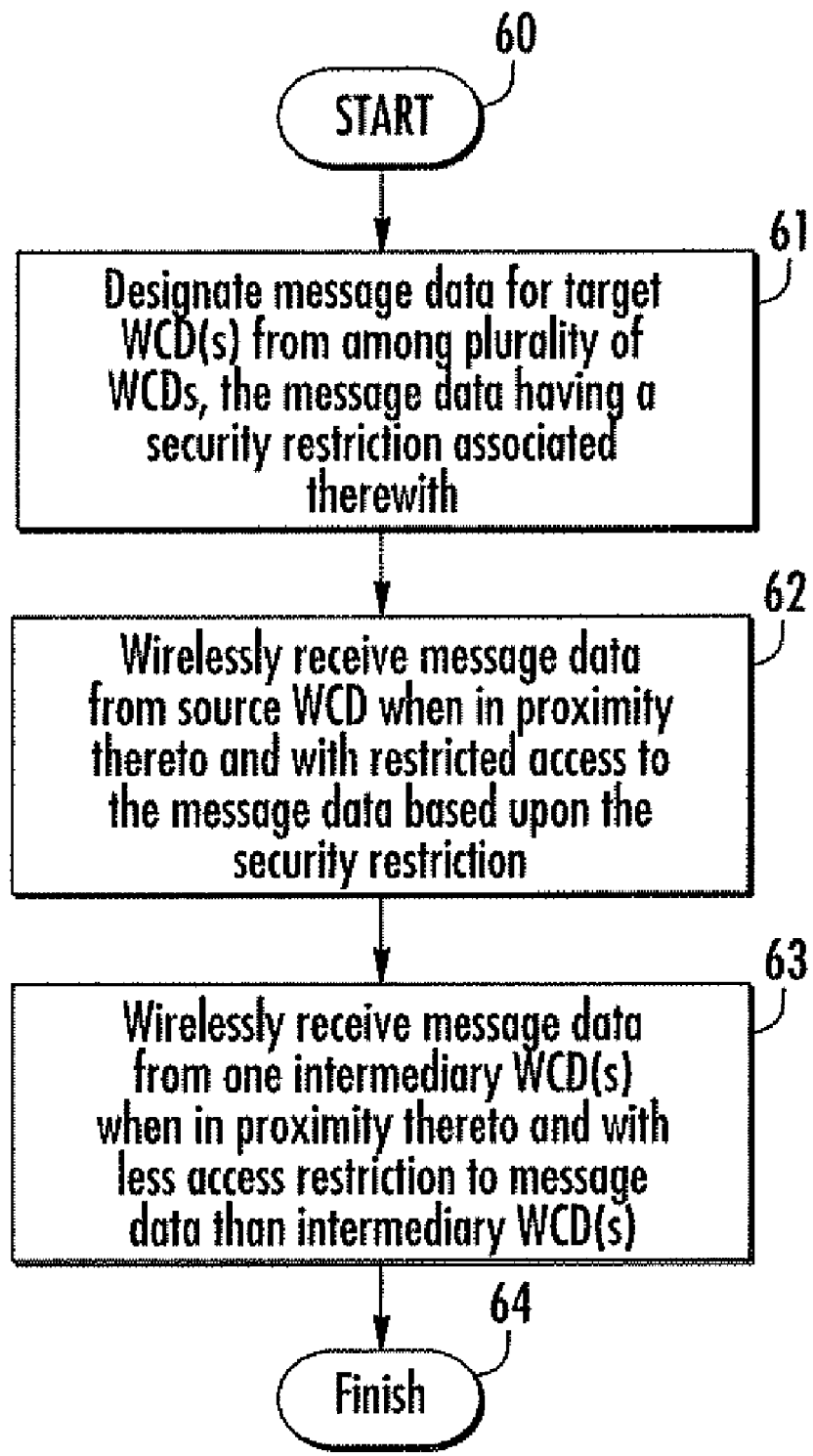
FIGS. 6 and 7 are flow diagrams illustrating method aspects associated with the systems of FIGS. 1-3.
Figure 7:
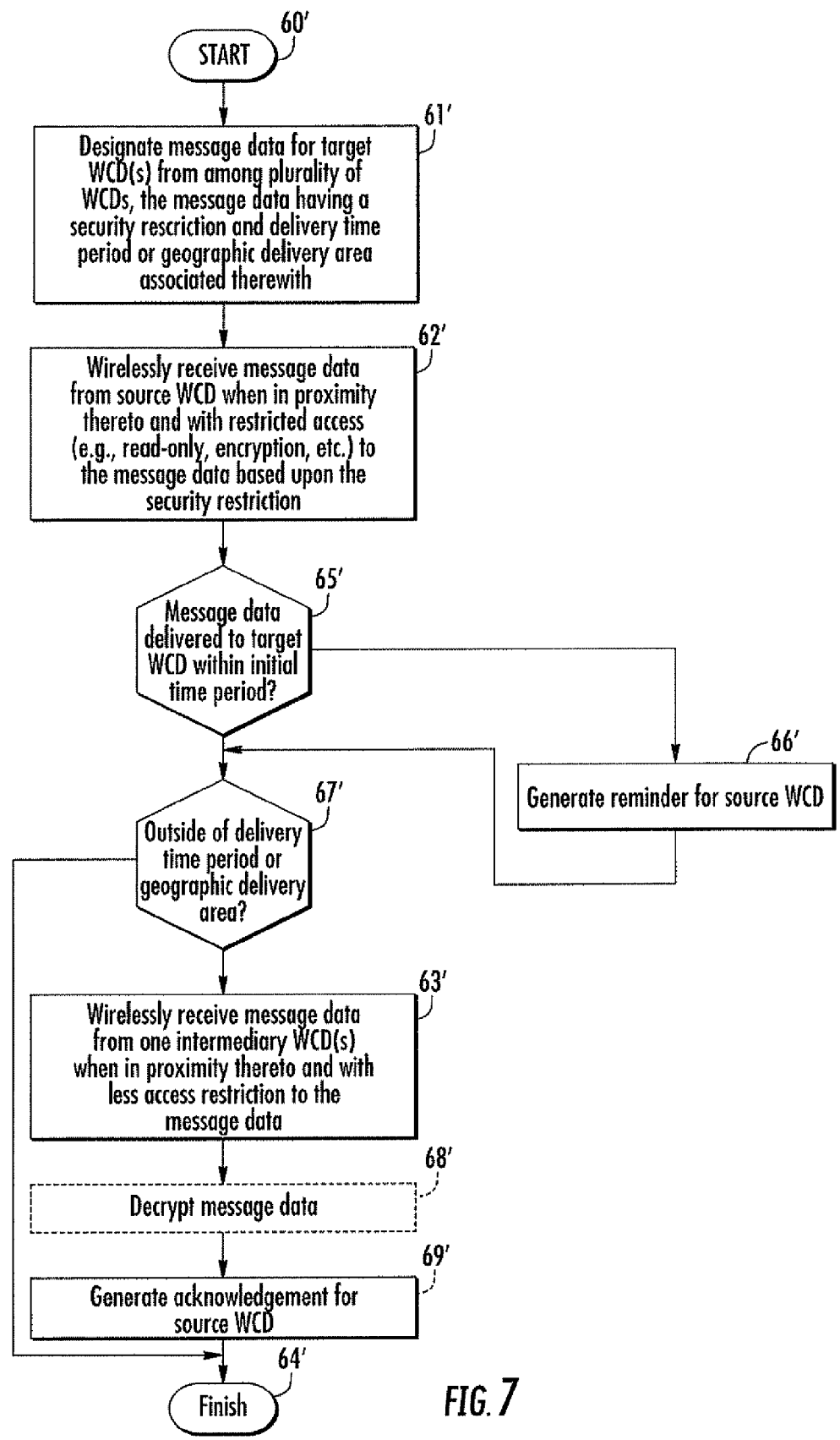

Referring initially to FIGS. 1, 6, and 7, a wireless communications system 30 and associated method aspects are first described. The system 30 illustratively includes a plurality of wireless communications devices (WCDs) 31-33. Depending upon the given embodiment, the WCDs 31-33 may be mobile devices, or they may be stationary devices that are not necessarily intended to be transported on a frequent basis, such as desktop computers (e.g., PCs, Macs, etc.). Example mobile WCDs may include portable or personal media players (e.g., music or MP3 players, video players, etc.), remote controls (e.g., television or stereo remotes, etc.), portable gaming devices, portable or mobile telephones, smartphones, tablet computers, etc.

Beginning at Blocks 60, 60', the WCD 31 operates as a source WCD that is configured to designate message data for one or more target WCDs 33, at Blocks 61, 61'. By way of example, the message data may comprise one or more types of data such as text, audio, images, video, etc. Moreover, the message data may also have a security restriction associated therewith. In this way, the WCD 32 may advantageously act as an intermediary WCD to deliver the message data between the source WCD 31 and the target WCD 33, the intended target or recipient of the message, but yet not have access (or have only restricted access) to the information being transferred. The system 30 may therefore advantageously provide a secure approach for the intermediary WCD 32 to "hand deliver" message data.

More particularly, the intermediary WCD 32 is configured to wirelessly receive the message data from the source WCD 31 when in proximity thereto, and with restricted access to the message data based upon the security restriction, at Blocks 62, 62'. In the example of FIG. 1, this occurs at a first time (time 1). The target WCD 33 is configured to wirelessly receive the message data from the intermediary WCD 32 when in proximity thereto and with less access restriction (e.g., unrestricted access) to the message data at a later time (time 2), at Blocks 63, 63', which illustratively concludes the method shown in FIG. 6 (Block 64).

By way of example, the WCDs 31-33 may be configured to wirelessly communicate the message data therebetween via near-field communication (NFC). By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Accordingly, NFC may be a particularly advantageous wireless communications format for the system 30 because it provides a secure approach for a mobile WCD (e.g., the intermediary WCD 32) to "hand deliver" information given the relatively close proximity between NFC devices when they wirelessly communicate with one another. However, it should be noted that other wireless communications formats may also be used in different embodiments, such as Bluetooth, wireless local area network (WLAN) (e.g., 802.11x), personal area network (PAN), infrared, etc.

In one example use case, all of the WCDs 31-33 may be mobile devices that use NFC technology. The source WCD 31 would initiate NFC communication with the intermediary device 32 and transfer the given message data thereto. The user of the source WCD 31 may ask the use of the intermediary WCD 32 to deliver the message data to the user of the target WCD 33. However, because the message is private or confidential, the intermediary WCD 32 is not able to access (or have only restricted or limited access to) the information that is being transferred.

The security or privacy restriction may be implemented by an application or "app" for message transfer that is installed on each of the WCDs 31-33. One approach is that the message data may be encrypted (Block 61'), in which case the target device 33 is provided with the appropriate decryption key or information required to decode the message data, whereas the intermediary device 32 would not be provided with the decryption key. Generally speaking, the message transfer application may allow the user of the source WCD 31 to choose which target WCD(s) 33 may receive the message data, and which intermediary WCD(s) 32 may be used to deliver the message data. For example, the application may allow whichever intermediary WCD 32 that is bumped, etc., to deliver message data, but designate only the given target WCD 33 as being able to open or access the message data. The application may also require authorized intermediary WCDs 32 to be designated before NFC (or other) wireless communications are initiated.

For example, the encryption/decryption key may be unique to respective source/target WCD pairs, and it may be exchanged by direct communication between the WCDs, whether by close range communication (e.g., NFC) or other communication channels, such as a cellular network, etc. However, encryption/decryption need not be used in all embodiments, and may perhaps be most appropriate where very sensitive or confidential information is being exchanged. In other embodiments, less restrictive access may be permitted, such as allowing "read only" access by the intermediary WCD 32, as opposed to write access or the ability to otherwise change or alter the message data.

Figure 4:
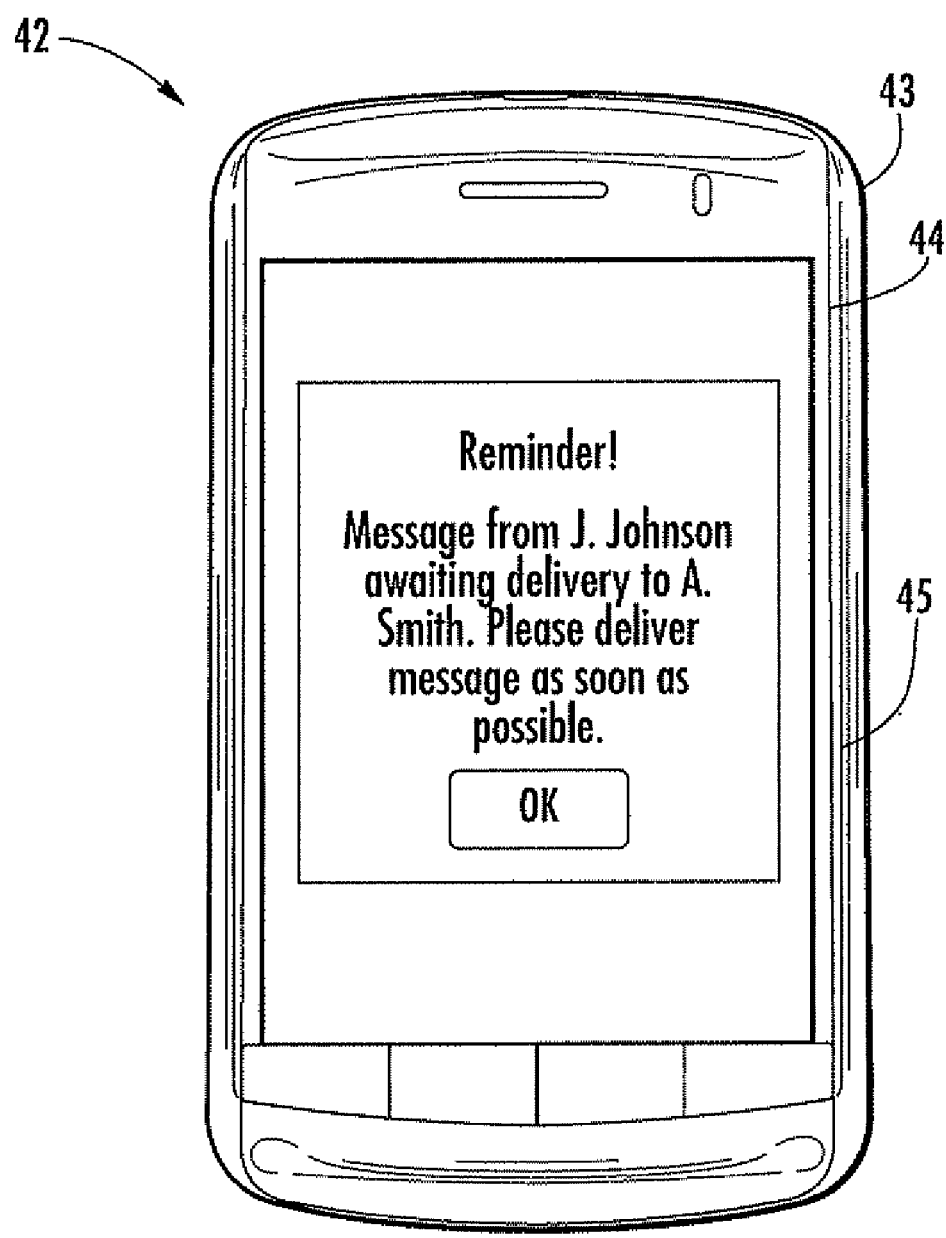
FIG. 4 is a front view of another example mobile wireless communications device that may be used with the systems of FIGS. 1-3.

Additionally, the intermediary WCD 32 may be configured to generate a reminder for the user to deliver the message data to the target WCD 33 if the message data is not delivered within an initial period of time, at Blocks 65'-66'. While a single reminder operation is shown in the example of FIG. 7, multiple reminders may be provided in some embodiments. For example, if the message data is urgent, it may be particularly advantageous for the intermediary WCD 32 to periodically generate alerts for its user to deliver the message to the target device 33, although this may be done with message data of a lower priority as well. An example intermediary mobile WCD 42 is shown in FIG. 4 which includes a mobile housing 43, and a display 44 carried by the mobile housing and on which a reminder window or screen 45 is displayed. The reminder window notes that a message from J. Johnson (i.e., the user assigned to a source WCD from which the message was received) is awaiting delivery to A. Smith (i.e., the user assigned to a target WCD to which the message data is directed).

It should be noted that while the intermediary WCD 32' is shown as a mobile WCD in the illustrated example of FIG. 4, in some embodiments the intermediary device need not be mobile. Instead, the intermediary WCD 32 may be a stationary device, while the source WCD 31 and target WCD 33 may both be mobile and approach the stationary intermediary WCD to transfer message data thereto, or receive message data therefore, respectively. In other embodiments, the source WCD 31 and target WCD 33 may be stationary devices, while the intermediary WCD 32 may be mobile, for example. As noted above, two or more of the WCDs 31-33 may be mobile devices in some embodiments as well.

In some implementations, it may also be desirable to place delivery restrictions on the message data, such as time or geographic restrictions. For example, if the intermediary WCD 32 does not deliver the message data within a specified delivery time period, or goes outside of a specified geographic delivery area, at Block 67', then the intermediary WCD may be prohibited from delivering the message data. By way of example, the source WCD 31 may be configured to allow a user associated therewith to select the delivery time period that the intermediary WCD 32 may hold the message data before delivery (e.g., if not delivered in twenty-four hours the message data is deleted or can no longer be transferred) (Block 61'). Such selections may be made for individual messages, or preferences may be set as a default for all messages or categories of messages.

Similarly, the source WCD 31 may be also be configured to permit the user associated therewith to select geographic limits on the mediator (e.g., if the intermediary device 32 leaves an office building, then the message is deleted or can no longer be transferred). The geographic location of the intermediary WCD may be tracked using an on-board satellite positioning receiver (e.g., GPS, etc.), communications with a wireless communications network (e.g., a wireless LAN or triangulation from cell tower communication), etc.

The target WCD 33 may be further configured to generate an acknowledgement for the source WCD 31 upon receipt of the message data from the intermediary WCD 32, at Block 69'. By way of example, the acknowledgement may be returned to the source WCD 31 via the intermediary WCD 32, that is, it may be returned through the same route it was received. Again, this may be done by close range communication, such as NFC, for example. Other approaches are that the target WCD 33 may send the acknowledgement via a separate network, such as a LAN or the Internet, either via wired or wireless (e.g., wireless LAN, WiMAX, cellular, etc.) connections via email, SMS, MMS, etc.

Figure 2:
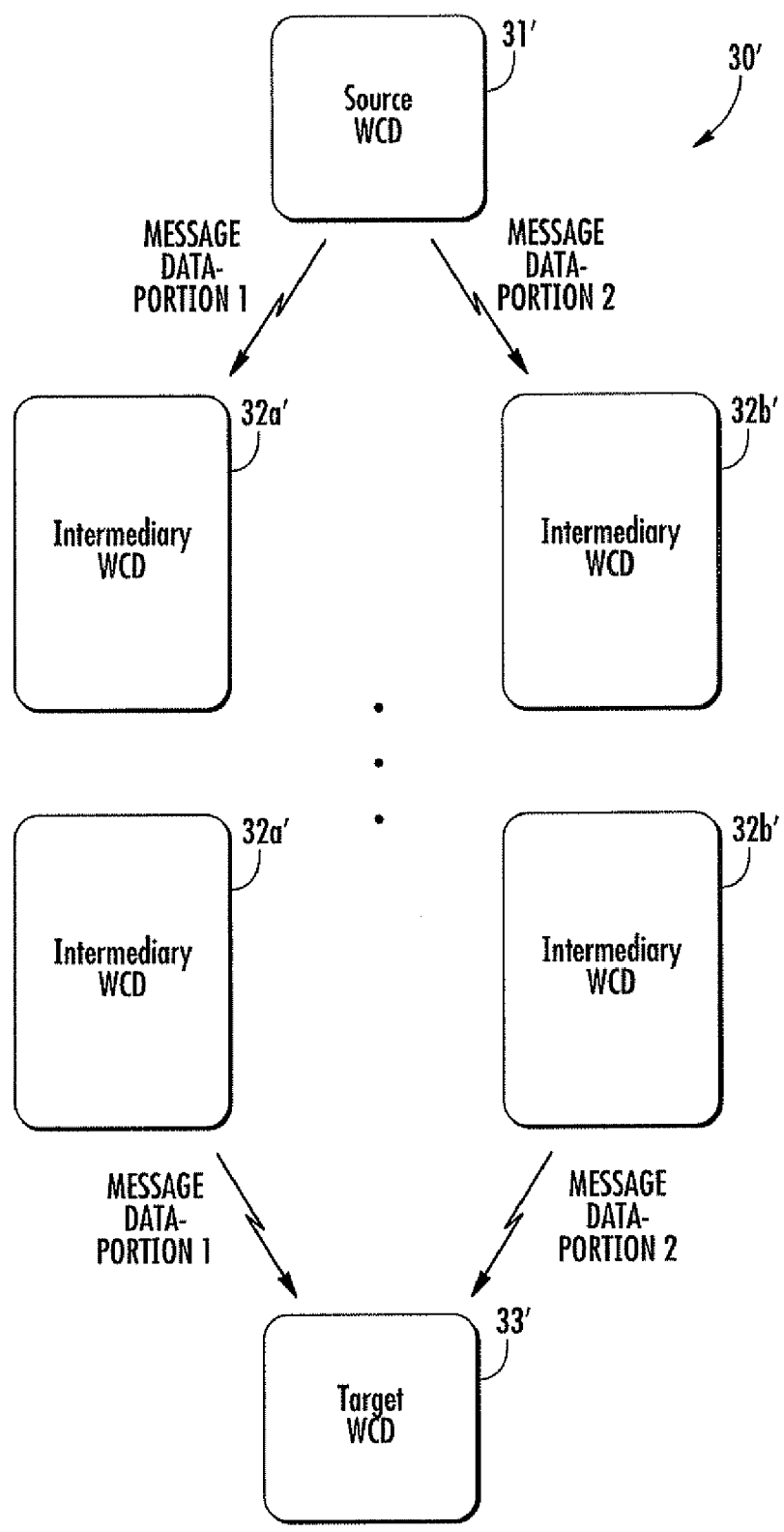
FIG. 2 is a schematic block diagram of an alternative example embodiment of the wireless communications system of FIG. 1.

Referring additionally to FIG. 2, in some embodiments of the system 30' a plurality of intermediary WCDs 32a', 32b' may be used to deliver the message data to the target WCD 33'. More particularly, the source WCD 31' may be configured to distribute different portions of the message data among the intermediary WCDs 32a', 32b' for delivery to the target WCD. In this way, the message is segmented and no one portion or part of the message data completes the message, which provides an extra measure of security. Instead, in this example embodiment, the message is only readable by the target device 33' when all of the intermediary WCDs 32a', 32b' have transferred their respective message data portions to the target device. Here again, an acknowledgement may be sent from the target WCD 33' to the source WCD 31' acknowledging that message data has been received in its entirety.

It should be noted that in some applications, the intermediary WCDs 32a', 32b' may instead be used to transfer message data in a chain or serial fashion between the source device 31' and the target device 33'. That is, rather than dividing a message into separate message data portions that are respectively transferred to the different intermediary WCDs 32a', 32b', a message may first be transferred to the intermediary WCD 32a', which in turn transfers the message to the intermediary WCD 32b', which then transfers it to the target device 33'. It should be noted that more than two intermediary WCDs may be used in either of the above-described embodiments as well.

Figure 3:
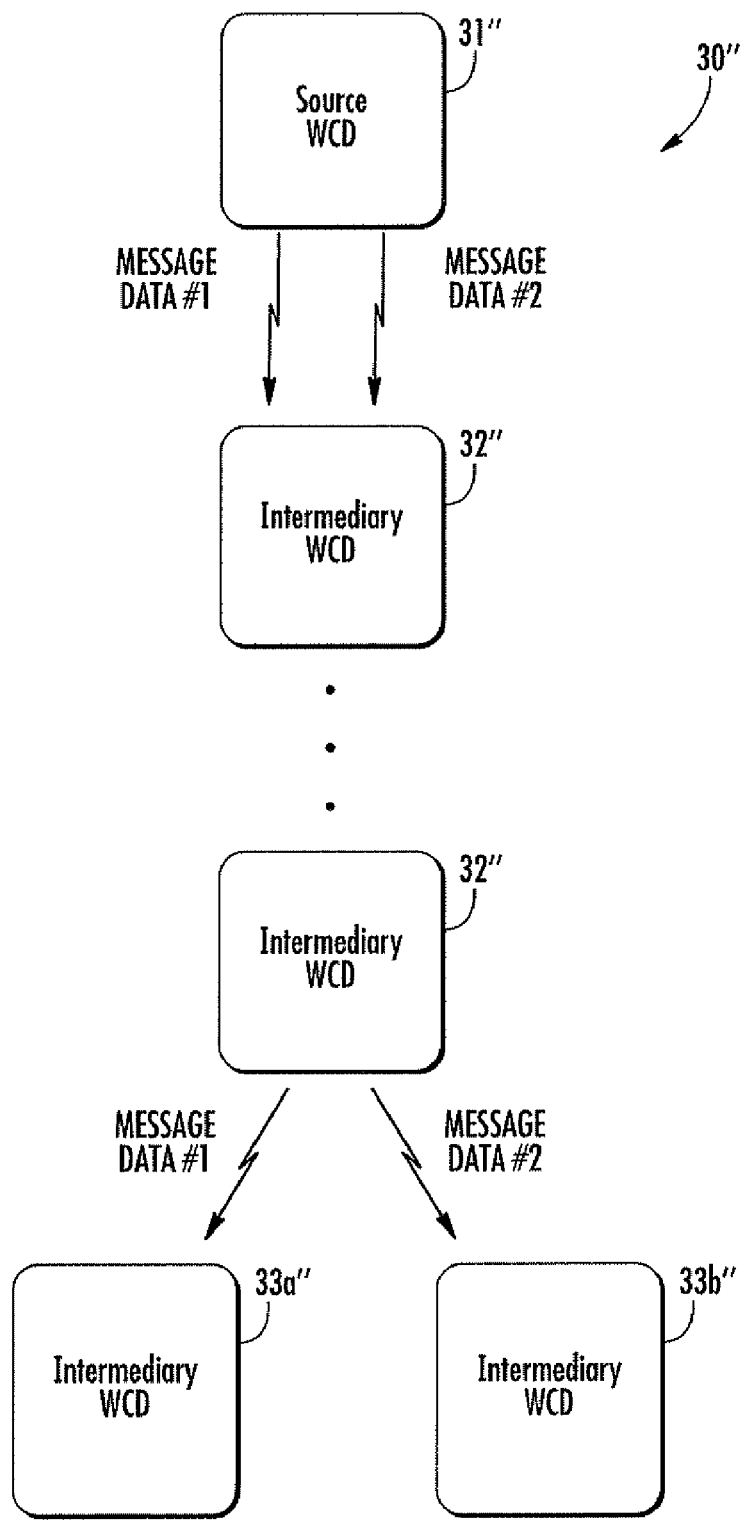
FIG. 3 is a schematic block diagram of another alternative example embodiment of the wireless communications system of FIG. 1.

Turning additionally to FIG. 3, in another example embodiment of the system 30" a plurality of target WCDs 33a", 33b" may receive respective message data from a single intermediary WCD 32". That is, the source WCD 31" may be configured to generate respective message data for each of the target WCDs 33a", 33b", and the intermediary WCD 32" may be configured to deliver respective message data to each corresponding target WCD 33a", 33b". Moreover, in some embodiments multiple messages may be relayed by the intermediary device 32" from multiple different source WCDs 31". The system 30' thereby advantageously provides the ability to deliver the appropriate message to the corresponding or respective recipient target WCD 33a", 33b".

Figure 5:
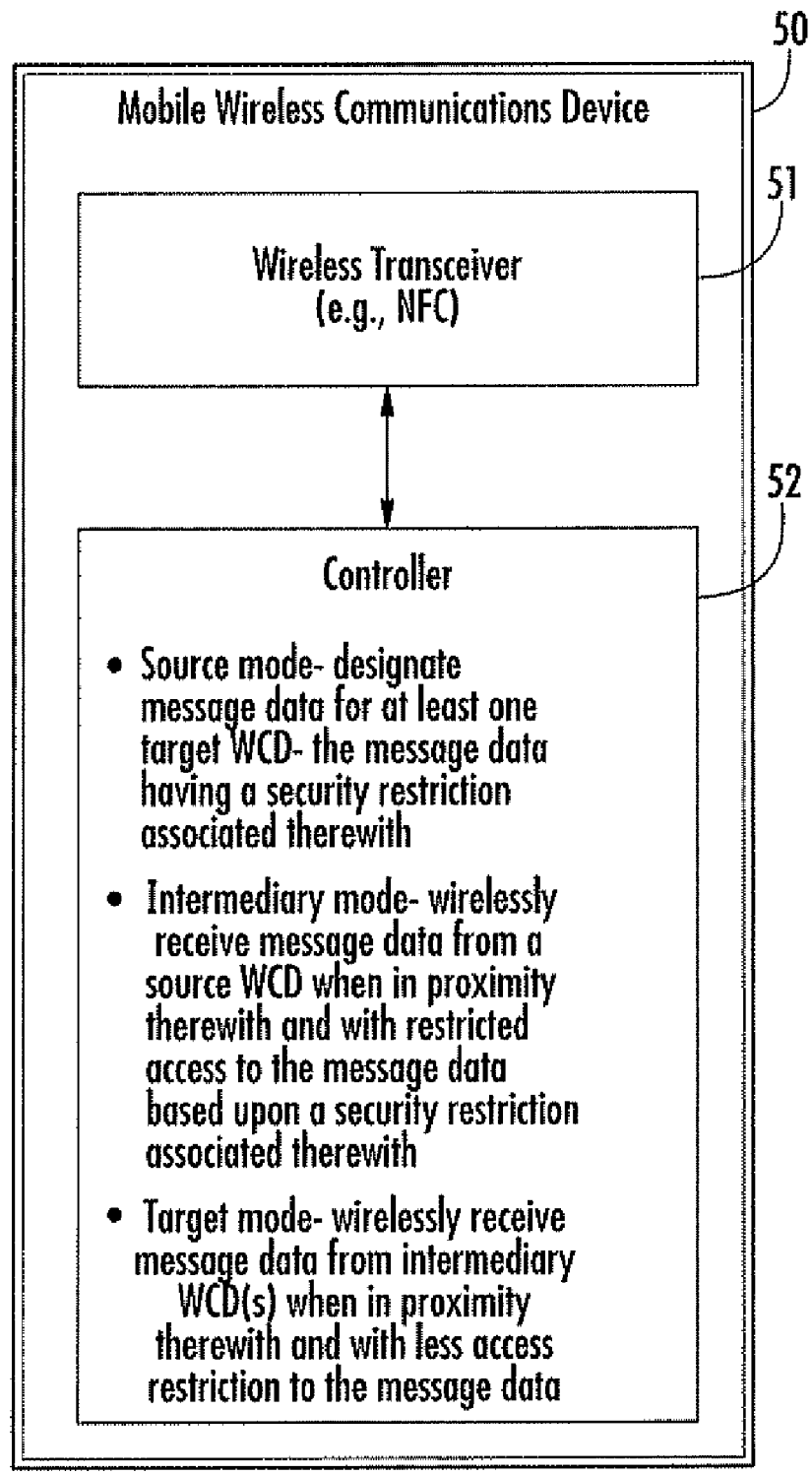
FIG. 5 is a schematic block diagram of an example mobile wireless communications device that may be used with the systems of FIGS. 1-3.

It should be noted that in some embodiments a same WCD may be used as a source, intermediary, or target WCD. Referring additionally to FIG. 5, a WCD 50 illustratively includes one or more wireless transceivers 51 (e.g., an NFC transceiver), and a controller 52 which cooperates with the wireless transceiver. In particular, the controller 52 is illustratively configured to operate in one of a plurality of modes comprising a source mode, an intermediary mode, and a target mode, in which the controller 52 performs the respective functions of source WCDs 31, 31', 31", intermediary WCDs 32, 32a' and 32b', 32", and the target WCDs 33, 33', 33a" and 33b" described above. Accordingly, in a given use case, the mobile WCD 50 may function as a source WCD, an intermediary WCD, or a target WCD. However, in some embodiments, a given WCD may be configured to operate in less than all of these three modes (e.g., as an intermediary WCD only, etc.) By way of example, the controller 52 may be implemented using a combination of hardware (e.g., microprocessor, memory, etc.) and software (i.e., a computer-readable medium having computer executable instructions or modules for performing the noted operations), such as with a mobile device application or app as described above.

The foregoing embodiments will be further understood with reference to various use case examples. In accordance with one example, a supervisor uses a source WCD 31 to transfer a confidential message (e.g., via NFC) to an intermediary WCD 32 of his administrator. The intermediary WCD 32 does not permit the administrator to see the message (or, if encrypted, decrypt it). The supervisor instructs the administrator to deliver the message (e.g., via NFC) to his direct staff via their respective target WCDs 33. The administrator then goes to each staff member and places their respective WCDs in proximity so that the message is then transferred to the target WCDs of the staff, and the staff members are able to see the message.

In another use case example, a first user with a mobile WCD is at a conference and meets a second user who knows a mutual acquaintance (i.e., a third user). The first user offers a message from his mobile WCD (i.e., the source WCD) via NFC to the mobile WCD of the second user (i.e., the intermediary WCD), and asks the second user to transfer the message data to the third user. At a later time, the second user meets the third user and delivers the message data to the third user's mobile (or stationary) WCD (i.e., the target WCD). The source mobile WCD may advantageously receive an acknowledgement via a wireless communications system that is triggered by the third user's WCD opening the message. Throughout the process, the WCD of the second user (i.e., the intermediary WCD) is unable to view the message.

Example components of a mobile wireless communications device 1000 that may be used in accordance with the above-described embodiments are further described below with reference to FIG. 8. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 8:
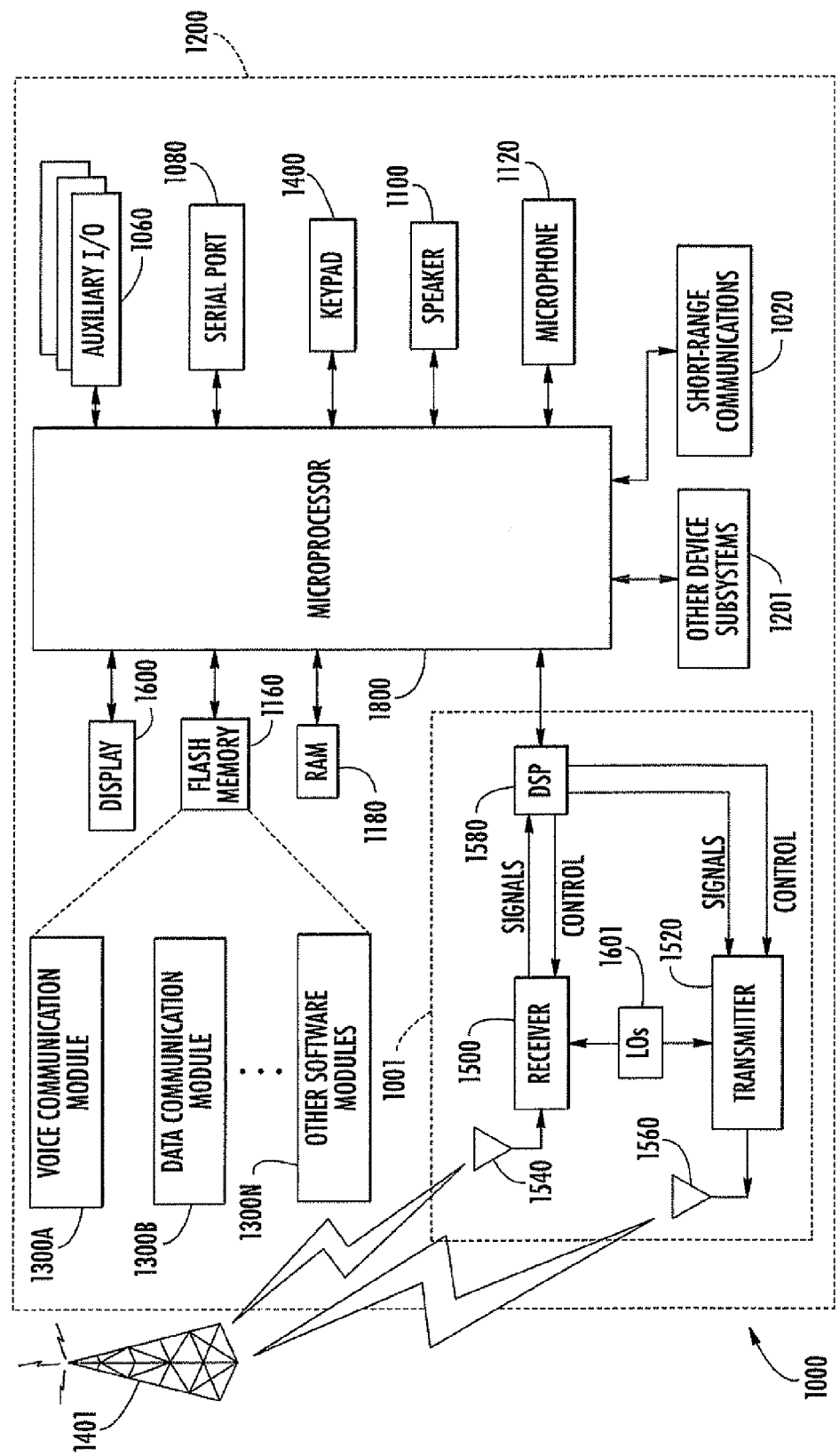
FIG. 8 is a schematic block diagram illustrating example components of a mobile wireless communications device that may be used with the devices of FIG. 4 or 5.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
    a plurality of wireless communications devices (WCDs);
    a source WCD from among said plurality of WCDs being configured to designate message data for at least one target WCD from among said plurality of WCDs, the message data having a security restriction associated therewith;
    at least one intermediary WCD from among said plurality of WCDs being configured to wirelessly receive the message data from said source WCD when in proximity thereto and with restricted access to the message data based upon the security restriction;
    said at least one target WCD being configured to wirelessly receive the message data from said at least one intermediary WCD when in proximity thereto and with less access restriction to the message data than said at least one intermediary WCD.

2. The system of claim 1 wherein said plurality of WCDs are configured to wirelessly communicate the message data via near-field communication (NFC).

3. The system of claim 1 wherein said source WCD is further configured to associate a delivery time period with the message data; and wherein said at least one intermediary WCD is configured to prohibit delivery of the message data to said at least one target WCD outside of the delivery time period.

4. The system of claim 1 wherein said source WCD is further configured to associate a geographic delivery area with the message data; and wherein said at least one intermediary WCD is configured to prohibit delivery of the message data to the at least one target WCD outside of the geographic delivery area.

5. The system of claim 1 wherein said at least one target WCD is further configured to generate an acknowledgement for said source WCD upon receipt of the message data from said at least one intermediary WCD.

6. The system of claim 1 wherein said at least one intermediary WCD comprises a plurality of intermediary WCDs; and wherein said source WCD is configured to distribute different portions of the message data among the plurality of intermediary WCDs for delivery to said at least one target WCD.

7. The system of claim 1 wherein said intermediary WCD is configured to generate at least one reminder to deliver the message data to said at least one target WCD.

8. The system of claim 1 wherein said at least one target WCD comprises a plurality of target WCDs;
    wherein said source WCD is configured to generate respective message data for each of said target WCDs; and wherein said at least one intermediary WCD is configured to deliver respective message data to each of said target WCDs.

9. The system of claim 1 wherein said at least one intermediary WCD is configured to notify said source WCD if the message data is not delivered to said at least one target WCD within a time period; and wherein said source WCD is configured to generate a reminder for said at least one intermediary WCD based upon the notification.

10. A wireless communications device (WCD) comprising:
    at least one wireless transceiver; and
    a controller cooperating with said at least one wireless transceiver and configured to operate in one of a plurality of modes comprising
        a source mode for designating message data for at least one target WCD from among a plurality of WCDs, the message data having a security restriction associated therewith,
        an intermediary mode for wirelessly receiving message data from a source WCD operating in the source mode when in proximity thereto and with restricted access to the message data based upon a security restriction associated therewith, and
        a target mode for wirelessly receiving the message data from at least one intermediary WCD operating in the intermediary mode when in proximity thereto and with less access restriction to the message data than the at least one intermediary WCD.

11. The wireless communications device of claim 10 wherein said at least one wireless transceiver comprises a near-field communication (NFC) transceiver.

12. The wireless communications device of claim 10 wherein said controller is further configured to prohibit delivery of message data to the at least one target WCD outside of an associated delivery time period when in the intermediary mode.

13. The wireless communications device of claim 10 wherein said controller is further configured to prohibit delivery of message data to the at least one target WCD outside of a geographic delivery area when in the intermediary mode.

14. A wireless communications method for a plurality of wireless communications devices (WCDs), the method comprising:
- designating message data at a source WCD for at least one target WCD, the message data having a security restriction associated therewith;
- wirelessly receiving the message data from the source WCD at at least one intermediary WCD when in proximity to the source WCD and with restricted access to the message data based upon the security restriction; and
- wirelessly receiving the message data at at least one target WCD from the at least one intermediary WCD when in proximity thereto and with less access restriction for the target WCD to the message data than the at least one intermediary WCD.

15. The method of claim 14 wherein the plurality of WCDs wirelessly communicate the message data via near-field communication (NFC).

16. The method of claim 14 further comprising:
- associating a delivery time period with the message data at the source WCD; and
- prohibiting delivery of the message data from the at least one intermediary WCD to the at least one target WCD outside of the delivery time period.

17. The method of claim 14 further comprising:
- associating a geographic delivery area with the message data at the source WCD; and
- prohibiting delivery of the message data from the at least one intermediary WCD to the at least one target WCD outside of the geographic delivery area.

18. A non-transitory computer-readable medium having computer-executable instructions for causing a wireless communications device (WCD) to perform steps comprising:
- designating message data for at least one target WCD from among a plurality of WCDs in a source mode, the message data having a security restriction associated therewith;
- wirelessly receiving message data from a source WCD operating in the source mode when in proximity thereto and with restricted access to the message data based upon a security restriction associated therewith in an intermediary mode; and
- wirelessly receiving the message data from at least one intermediary WCD operating in the intermediary mode when in proximity therewith and with less access restriction to the message data in a target mode than the at least one intermediary WCD.

19. The non-transitory computer-readable medium of claim 18 wherein the WCD wirelessly receives message data via near-field communication (NFC).

20. The non-transitory computer-readable medium of claim 18 further having computer-executable instructions for causing the WCD to prohibit delivery of message data to the at least one target WCD outside of an associated delivery time period when in the intermediary mode.

\* \* \* \* \*